(12) United States Patent
Dai et al.

(10) Patent No.: US 10,202,540 B2
(45) Date of Patent: Feb. 12, 2019

(54) ZIRCONIUM GEL PARTICLE COMBINATION FLOODING SYSTEM AND PREPARATION METHOD THEREOF

(71) Applicant: CHINA UNIVERSITY OF PETROLEUM, Qingdao, Shandong (CN)

(72) Inventors: Caili Dai, Shandong (CN); Guang Zhao, Shandong (CN); Qing You, Shandong (CN); Mingwei Zhao, Shandong (CN)

(73) Assignee: CHINA UNIVERSITY OF PETROLEUM (CN)

( * ) Notice: Subject to any disclaimer, the term of this patent is extended or adjusted under 35 U.S.C. 154(b) by 0 days.

(21) Appl. No.: 15/038,359

(22) PCT Filed: Nov. 21, 2014

(86) PCT No.: PCT/CN2014/091821
§ 371 (c)(1),
(2) Date: May 20, 2016

(87) PCT Pub. No.: WO2015/074588
PCT Pub. Date: May 28, 2015

(65) Prior Publication Data
US 2016/0289540 A1    Oct. 6, 2016

(30) Foreign Application Priority Data

Nov. 21, 2013  (CN) .......................... 2013 1 0595858

(51) Int. Cl.
*E21B 43/20* (2006.01)
*C09K 8/584* (2006.01)
*C09K 8/03* (2006.01)

(52) U.S. Cl.
CPC .............. *C09K 8/584* (2013.01); *C09K 8/032* (2013.01); *E21B 43/20* (2013.01); *C09K 2208/10* (2013.01)

(58) Field of Classification Search
None
See application file for complete search history.

(56) References Cited

U.S. PATENT DOCUMENTS 3,667,546 A * 6/1972 Parker .................... C09K 8/512
166/270.1
3,811,504 A    5/1974 Flournoy et al.
(Continued)

FOREIGN PATENT DOCUMENTS

CN    101845300 A    9/2010
CN    102504794 A    6/2012
(Continued)

*Primary Examiner* — Andrew Sue-Ako
(74) *Attorney, Agent, or Firm* — Calfee, Halter & Griswold LLP

(57) ABSTRACT

The invention belongs to the field of oilfield chemistry and specifically relates to a zirconium gel particle combination flooding system. The zirconium gel particle combination flooding system comprises multi-scale 1 zirconium gel particles, polyether nonionic surfactant, and water as mixing liquid; the weight percentage of multi-scale zirconium gel particles in the combination flooding system ranges from 0.16% to 0.24%; the weight percentage of polyether nonionic surfactant in the combination flooding system ranges from 0.1% to 0.4%; the rest is water, and the sum of the weight percentage of the each component is 100%. The multi-scale zirconium gel particles and polyether nonionic surfactant of the present invention perform good synergistic effect, which reduces the oil/water interfacial tension to the order of magnitude of $10^{-3}$ mN/m, significantly improves the displacing efficiency of the flooding agent, avoids the adverse effects caused by polymer viscosity loss in binary (Continued)

combination flooding or ternary combination flooding and the adverse effects caused by alkalis, as well as improves the flooding performance of the combination flooding system.

1 Claim, 2 Drawing Sheets

(56) References Cited

U.S. PATENT DOCUMENTS

| | | | | |
|---|---|---|---|---|
| 3,811,505 | A | 5/1974 | Flournoy et al. | |
| 4,915,170 | A * | 4/1990 | Hoskin | C09K 8/887 166/270 |
| 5,513,705 | A * | 5/1996 | Djabbarah | C09K 8/58 166/270.1 |
| 6,439,308 | B1 * | 8/2002 | Wang | C09K 8/58 166/270 |
| 2007/0204989 | A1 * | 9/2007 | Tang | C09K 8/508 166/270 |
| 2009/0288825 | A1 * | 11/2009 | Tang | C09K 8/584 166/263 |
| 2014/0073538 | A1 * | 3/2014 | Saini | C09K 8/035 507/215 |
| 2016/0289540 | A1 * | 10/2016 | Dai | C09K 8/032 |

FOREIGN PATENT DOCUMENTS

| | | |
|---|---|---|
| CN | 102575150 A | 7/2012 |
| CN | 102936490 A | 2/2013 |
| CN | 103589414 A | 2/2014 |

* cited by examiner

ZIRCONIUM GEL PARTICLE COMBINATION FLOODING SYSTEM AND PREPARATION METHOD THEREOF

TECHNICAL FIELD

The present invention belongs to the field of oilfield chemistry, particularly, it relates to a combination flooding system comprising multi-scale zirconium gel particles and polyether nonionic surfactant as well as preparation method and flooding method thereof.

BACKGROUND TECHNOLOGY

Waterflooding extraction is the general oilfield extraction method in China, but long-term use of waterflooding extraction causes the worsening of stratigraphic heterogeneity, and further causes the acceleration of water production increase during the mid and late oilfield extraction period, low water displacing efficiency or invalid circulating as well as the incapability to extract large amount of oil stayed in stratum. Therefore, how to apply potential tapping of remaining oil is crucial and significant to the stable and increasing yield of the mid to late water flooding extraction in oilfield. Improving the swept volume of flooding agent and displacing efficiency are two approaches for controlling water and stabilizing oil in oilfields nowadays, and chemical combination flooding technologies mainly comprising polymer/surfactant binary combination flooding and polymer/surfactant/alkali ternary combination flooding are the most important technical means for remaining oil potential tapping, also, success have been achieved from on-site application of such chemical combination flooding technologies. The main function of polymer in compound flooding is to increase the viscosity of flooding fluid to expand its swept volume, while the main roles of surfactant and alkali are to decrease the oil/water interface tension, to emulsified crude oil and to change the rock wettability for improving the displacing efficiency, and eventually achieving the deep potential tapping of residual oil. However, there are some problems of chemical combination flooding technologies in on-site application: such as, in polymer/surfactant based binary combination flooding method, the polymer are influenced by the shearing of mechanical equipment and formation porous as well as the physicochemical properties of the stratum, which causes a significant decrease of polymer viscosity and weakening of mobility control ability; in polymer/surfactant/alkali ternary combination flooding, the addition of alkali greatly improves the effect of ternary combination flooding, but the existence of alkali will cause scaling in shaft and injury to stratum, also bring difficulties to demulsification of the subsequent produced liquid.

The key of combination flooding technology is how to select reasonable polymer and high-efficient surfactant, while the adverse effect of alkali can be minimized and combination flooding effect can be achieved. CN102504794A discloses a hydrophobic associated polymer-mixed surfactant binary combination flooding system used for tertiary oil recovery, which consists of hydrophobic associated polymer, petroleum sulfonate, n-pentanol, dodecyl betaine and water for the rest. This combination flooding system can decrease oil/water interface tension for $10^{-3}$ mN/m, and improve the recovery efficiency by more than 20%. However, the components of mixed surfactant are relatively complicated, the mobility control ability of polymer in the combination flooding is relatively weak, especially in the subsequent flooding period the injection pressure decreases fast, and the flooding agent is easy to escape to nearby oil well, which significantly limit the flooding effect of flooding agent, decrease the use value of flooding agent and is difficult to get a long-term development effect.

To improve mobility control ability of the polymer in the polymer flooding or the combination flooding and to overcome the uncontrollable influence of stratum conditions, the colloidal dispersion gel (CDG), pre-performed particle gel (PPG) and the dispersed-particle gel (DPG) profile control and flooding technologies are developed. However, the colloidal dispersion gel (CDG) are influenced by the shearing of mechanical equipment and formation porous as well as the physicochemical properties of the stratum, which causes the uncontrollable of the gelation time of gel, the gel strength and the entering depth into stratum difficult. The injectivity and selectivity of pre-performed particle gel (PPG) is worse. Considering the deficiency of the prior art, CN102936490A discloses a preparation method of an environmentally friendly multi-scale zirconium gel particles. This preparation method is simple but effective, and the zirconium gel particles prepared is not affected by the uncontrollable formation condition during the gelation reaction which may satisfy the need for large-scale industrial production, additionally, the zirconium gel particles is environmentally friendly. Because of its particle scale, the zirconium gel particles of nanometer-scale, micron-scale and millimeter-scale obtained by using this method can enter into the deep stratum, then aggregates and strands in the deep stratum, in order to effectively adjust the water injection profile in stratum. In addition, the mobility control ability of the zirconium gel dispersion is better, which will eventually switch the subsequent waterflooding to low permeability layer and expand the coverage of subsequent waterflooding. However, this method concentrates on achieving high oil recovery from expanding the coverage of subsequent fluid, but takes no account of how to improve displacing efficiency of flooding agent.

In order to maximize the oil recovery, a new kind of displacement combination flooding system needs to be developed which not only can increase displacement efficiency, but also expand the swept volume.

SUMMARY OF INVENTION

Considering the deficiency of prior art, the present invention provides a multi-scale zirconium gel particle and surfactant combination flooding system and the preparation method thereof. The combination flooding system can be applied in many types of heterogeneous reservoir. The combination flooding system is injected into oil reservoir in segments, which can maximize the flooding effect of the combination flooding system.

For the above-mentioned purpose, the present invention provides the following technical solution:

A zirconium gel particle combination flooding system, comprising: multi-scale zirconium gel particles, polyether nonionic surfactant and water as mixing liquid, wherein:

The weight percentage of multi-scale zirconium gel particles in the combination flooding system ranges from 0.16% to 0.24%;

The weight percentage of polyether nonionic surfactant in the combination flooding system ranges from 0.1% to 0.4%;

The rest is water, and the sum of the weight percentage of each component is 100%.

The preparation method of the above-mentioned zirconium gel particle combination flooding system includes the following steps:

Firstly adding one of nano-scale, micron-scale or millimeter-scale zirconium gel particles to the water as mixing liquid under room temperature (20±5° C.), stirring for five minutes until it being uniformly dispersed; then adding the polyether nonionic surfactant, stirring for another five minutes until it being dissolved thoroughly, so that the zirconium gel particle gel combination flooding system is obtained. The weight percentage of zirconium gel particles in the zirconium gel particle combination flooding system ranges from 0.16% to 0.24%, while the weight percentage of surfactant ranges from 0.1% to 0.4%. A flooding method is to apply the above-mentioned zirconium gel particle combination flooding system for flooding, when the water cut of the water injection well rises significantly, low effect or even no effect of waterflooding causes worse development effect, and there are large amounts of residual oil in the stratum. The flooding method includes the following steps:

(1). Injecting the prepositive pretreatment plug into stratum, the injection volume of which ranges 0.1% to 1.0% of the formation porous volume.

(2). Injecting the main plug into stratum, the injection volume of which ranges from 30% to 50% of the formation porous volume.

(3). Injecting the postpositive protective plug into stratum, the injection volume of which ranges from 0.1% to 1.0% of the formation porous volume.

(4). Shutting in the well for five to ten days;

(5). Starting up the well to reproduct.

Compared to prior art, the present invention has the following advantages:

(1) The multi-scale zirconium gel particles and polyether nonionic surfactant used in the present invention show good synergistic effect. When the concentration of polyether nonionic surfactant ranges from 0.1% to 0.4%, the combination system shows higher interfacial activity, which can decrease oil/water interface tension to the order of magnitude of $10^{-3}$ mN/m and significantly improve the oil displacing efficiency of the flooding agent;

(2) The multi-scale zirconium gel particle combination flooding system of the present invention can be applied in kinds of heterogeneous oil reservoir condition. The zirconium gel particles shows good temperature-resistant, salt-resistant and shear-resistant properties, which can avoid the adverse impact from the loss of polymer viscosity in binary combination flooding or ternary combination flooding;

(3) The multi-scale zirconium gel particle combination flooding system of the present invention shows good aging stability. The oil/water interface tension still can reach to the order of magnitude of $10^{-2}$ mN/m after aging at 75° C. for two months;

(4) The multi-scale zirconium gel particles of the present invention aggregates after aging under the reservoir temperature. The aggregations can plug the highly permeable channel and make the subsequent injection pressure maintaining a higher level. The multi-scale zirconium gel particles show good mobility control ability, and significantly increase the sweep volume of subsequent fluid;

(5) The present invention is an alkali-free invention, so it can avoid the adverse impact of alkali;

(6) The flooding method of the present invention is simple, which can maximizing the flooding effect of the combination flooding system.

DETAILED DESCRIPTION OF THE EMBODIMENTS

Figure 1:
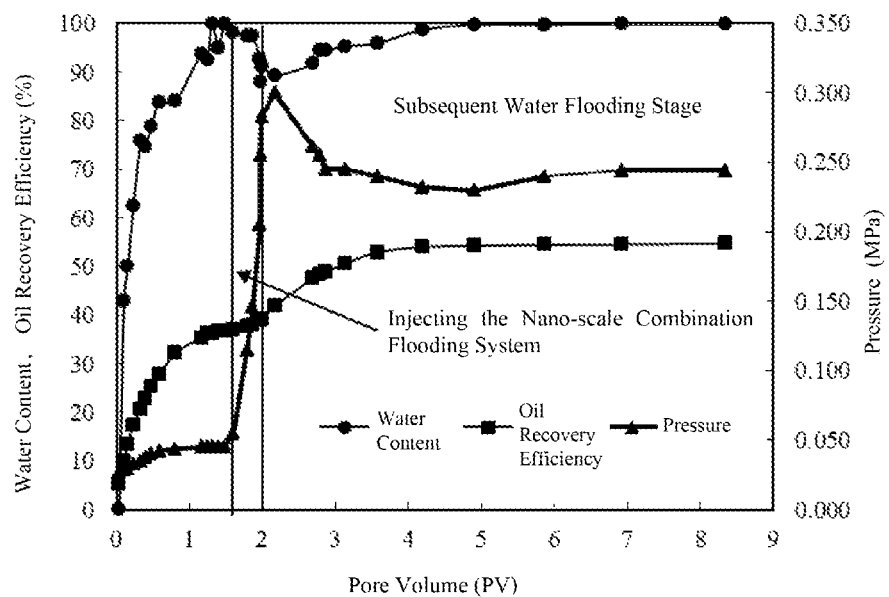
FIG. 1 shows the oil recovery curve of nano-scale zirconium gel particle combination flooding system.

Zirconium gel particle combination flooding system, comprising: multi-scale zirconium gel particles, polyether nonionic surfactant and water as mixing liquid;

The weight percentage of multi-scale zirconium gel particles in the combination flooding system ranges from 0.16% to 0.24%;

The weight percentage of polyether nonionic surfactant in the combination flooding system ranges from 0.1% to 0.4%;

The rest is water, and the sum of the weight percentage of each component is 100%.

The multi-scale zirconium gel particles is nano-scale, micron-scale or millimeter-scale water-soluble dispersed-particle gel, which is prepared by mechanical shearing bulk zirconium gel, and the particle diameter of the multi-scale zirconium gel particles ranges from 92 nm to 5.5 mm. The multi-scale zirconium gel particles of combination flooding system is one of nano-scale, micron-scale and millimeter-scale zirconium gel particles. The multi-scale dispersed-particle gel of the present invention aggregates, which could plug the highly permeable channels, increase the swept volume of subsequent fluid and improve the mobility control ability of the combination flooding system.

The formula of the polyether nonionic surfactant is as follows,

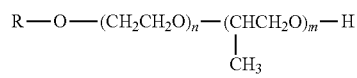

in the formula, R represents $C_8 \sim C_{13}$ alkyl, n represents the total number of ethoxy groups, n=2~4; m represents the total number of propoxy groups, m=1, 2; wherein n and m are integers. The addition of surfactant can increase the ability of decreasing oil/water interface tension of the combination flooding system, which is good for peeling remaining oil off from the rock surface and improves the displacing efficiency of the combination flooding system.

The water as mixing liquid is clean water or treated oilfield recycled produced water.

The preparation method of the zirconium gel particle combination flooding system comprising the following steps:

Firstly adding one of nano-scale, micron-scale or millimeter-scale zirconium gel particles to the water as mixing liquid under room temperature (20±5V), stirring for five minutes until it being uniformly dispersed; then adding the polyether nonionic surfactant, stirring for another five minutes until it being dissolved thoroughly. The weight percentage of the zirconium gel particles in the zirconium gel particle combination flooding system ranges from 0.16% to 0.24%, while the weight percentage of surfactant ranges from 0.1% to 0.4%, so that the zirconium gel particle combination flooding system is obtained.

A flooding method is to apply the above-mentioned zirconium gel particle combination flooding system for flooding, when the water cut of the water injection well rises significantly, low effect or even no effect of waterflooding causes worse development effect, and there are large amounts of residual oil in the stratum. The flooding method includes the following steps:

(1). Injecting the prepositive pretreatment plug into stratum, the injection volume of which ranges from 0.1% to 1.0% of the formation porous volume.

(2). Injecting the main plug into stratum, the injection volume of which ranges from 30% to 50% of the formation porous volume.

(3). Injecting the postpositive protective plug into stratum, the injection volume of which ranges from 0.1% to 1.0% of the formation porous volume.

(4). Shutting in the well for five to ten days;

(5). Starting up the well to reproduce.

The prepositive pretreatment plug is aqueous solution of the above polyether nonionic surfactant, the weight percentage of the polyether nonionic surfactant in the aqueous solution ranges from 0.1% to 0.4%. By injecting the prepositive pretreatment plug, the oil saturation of the region near wellbore can be decreased, and the relative permeability difference between oil and water layer can be increase, which is good for injection of the subsequent working liquid.

The main plug is the combination flooding system. Owing to the injection of the combination flooding system plug, the high-efficiency surfactant in combination flooding system can significantly improve displacement efficiency of flooding agent through decreasing oil/water interface tension, while the multi-scale zirconium gel particles may aggregate and seal the highly permeable channels, then increase the sweep volume of subsequent fluid. The oil recovery efficiency is significantly improved owing to the synergistic effect of the above two components.

The postpositive protective plug is aqueous solution of nano-scale, micron-scale or millimeter-scale zirconium gel particles. The weight percentage of zirconium gel particles in the aqueous solution ranges from 0.16% to 0.24%. Injecting the postpositive protective plug can protect main plug fully effective, prevent main plug from breaking due to the high differential pressure of near wellbore region, and increase the injection pressure.

Example 1

The preparation method of nano-scale zirconium gel particle combination flooding system and the flooding method are provided in the example.

The nano-scale zirconium gel particle combination flooding system, comprises: nano-scale zirconium gel particles, the weight percentage of which in the combination flooding system is 0.24%; polyether nonionic surfactant, the weight percentage of which in the combination flooding system is 0.1%; and clean water as mixing liquid for the rest, the weight percentage of which in the combination flooding system is 99.66%. The sum of the weight percentage of each component is 100%.

Under room temperature (20±5° C.), sequentially adding 0.24 g nano-scale zirconium gel particles (with the particle diameter of 108 nm) and 0.1 g polyether nonionic surfactant into 99.66 g clean water while stirring, keeping stirring for 5 minutes to prepare the zirconium gel particle combination flooding system. The combination flooding system can decreases oil/water interface tension to $2.4135 \times 10^{-3}$ mN/m.

The flooding method of the nano-scale zirconium gel particle combination flooding system is provided in the example, which is as follows: vacuumizing the artificial core (with the length of 8.3 cm, diameter of 2.5 cm and pore volume of 11.35 mL) with a permeability of 1.44 $\mu m^2$, and saturating brine water in the core, sequentially saturating oil in the core, and water flooding until the effluent water cut up to 98% at 75° C.; then conducting flooding using the combination flooding system according to the following three plugs: prepositive pretreatment plug, main plug and postpositive protective plug. The specific combination flooding steps using the nano-scale zirconium gel particles are as follows:

(1) Prepositive pretreatment plug: the prepositive pretreatment plug is aqueous solution of the above polyether nonionic surfactant. The weight percentage of the polyether nonionic surfactant in the aqueous solution is 0.1%. The injection volume of the prepositive pretreatment plug is 0.1% of the core pore volume.

(2) Main plug: the main plug is the combination flooding system comprising: nano-scale zirconium gel particles (with the particle diameter of 108 nm), of which the weight percentage is 0.24%; and surfactant, of which the weight percent is 0.1%. The injection volume of the main plug is 50% of the core pore volume;

(3) Postpositive protective plug: the postpositive protective plug is aqueous solution of nano-scale zirconium gel particles (with the particle diameter of 108 nm). The weight percentage of zirconium gel particles in the aqueous solution is 0.24%. The injection volume of the postpositive protective plug is 1.0% of the core pore volume.

After finishing the above three steps, aging for 5 days under 75° C., conducting waterflooding again till the water cut reaches 98%. From FIG. 1 showing the oil recovery curve, it can be seen that after injecting the nano-scale zirconium gel particle combination flooding system, the pressure is increased significantly in the subsequent water flooding stage and remains high after injection of water of 5 times of pore volume, the mobility control ability improved, and the oil recovery increases significantly by 17.94%.

Example 2

The preparation method of micron-scale zirconium gel particle combination flooding system and the flooding method are provided in the example.

The micron-scale zirconium gel particle combination flooding system, comprises: micron-scale zirconium gel particles, the weight percentage of which in the combination flooding system is 0.2%; polyether nonionic surfactant, the weight percentage of which in the combination flooding system is 0.3%; and clean water as mixing liquid for the rest, the weight percentage of which in the combination flooding system is 99.5%. The sum of the weight percentage of each component is 100%.

Under room temperature (20±5° C.), sequentially adding 0.2 g micron-scale zirconium gel particles (with the particle diameter of 5.6 μm) and 0.3 g polyether nonionic surfactant into 99.5 g clean water while stirring, keeping stirring for 5 minutes to prepare the micron-scale zirconium gel particle combination flooding system. The combination flooding system can decreases oil/water interface tension to $1.6352 \times 10^{-3}$ mN/m.

The flooding method of the micron-scale zirconium gel particle combination flooding system is provided in the example, which is as follows: vacuumizing the artificial core (with the length of 8.3 cm, diameter of 2.5 cm and pore volume of 11.35 mL) with a permeability of 4.43 $\mu m^2$, and saturating brine water in the core, sequentially saturating oil in the core, and water flooding until the effluent water cut up to 98% at 75° C.; then conducting flooding using the combination flooding system according to the following three plugs: prepositive pretreatment plug, main plug and postpositive protective plug. The specific combination flooding steps using the micron-scale zirconium gel particles are as follows:

(1) Prepositive pretreatment plug: the prepositive pretreatment plug is aqueous solution of the above polyether nonionic surfactant. The weight percentage of the polyether nonionic surfactant in the aqueous solution is 0.2%. The injection volume of the prepositive pretreatment plug is 0.5% of the core pore volume.

(2) Main plug: the main plug is the combination flooding system comprising: micron-scale zirconium gel particles (with the particle diameter of 5.6 μm), of which the weight percentage is 0.2%; and surfactant, of which the weight percentage is 0.3%. The injection volume of the main plug is 40% of the core pore volume.

(3) Postpositive protective plug: the postpositive protective plug is aqueous solution of micron-scale zirconium gel particles (with the particle diameter of 5.6 μm). The weight percentage of zirconium gel particles in the aqueous solution is 0.2%. The injection volume of the postpositive protective plug is 0.5% of the core pore volume.

Figure 2:
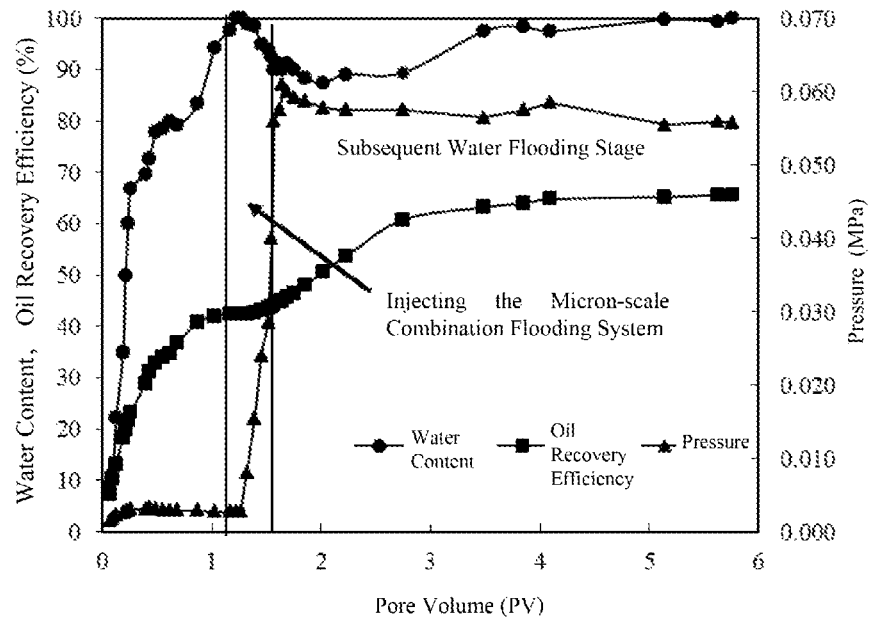
FIG. 2 shows the oil recovery curve of micron-scale zirconium gel particle combination flooding system.

After finishing the above three steps, aging for 5 days under 75° C., conducting waterflooding again till the watercut reaches 98%. From FIG. 2 showing the oil recovery curve, it can be seen that after injecting the micron-scale zirconium gel particle combination flooding system, the pressure is increased from 0.0028 MPa while waterflooding to 0.055 MPa in the subsequent water flooding stage, so the pressure increases significantly and remains high in the subsequent water flooding stage, which indicates that the zirconium gel particle combination flooding system can effectively plug the big channels, performs good mobility control ability and increases the oil recovery significantly by 23.2%.

Example 3

The preparation method of millimeter-scale zirconium gel particle combination flooding system and the flooding method are provided in the example.

The millimeter-scale zirconium gel particle combination flooding system, comprises: millimeter-scale zirconium gel particles, the weight percentage of which in the combination flooding system is 0.16%; polyether nonionic surfactant, the weight percentage of which in the combination flooding system is 0.4%; and clean water as mixing liquid for the rest, the weight percentage of which in the combination flooding system is 99.44%. The sum of the weight percentage of each component is 100%.

Under room temperature (20±5° C.), sequentially adding 0.16 g millimeter-scale zirconium gel particles (with the granule diameter of 3.3 mm) and 0.4 g polyether nonionic surfactant into 99.44 g clean water while stirring, keeping stirring for 5 minutes to prepare the millimeter-scale zirconium gel particle combination flooding system. The combination flooding system can decreases oil/water interface tension to $1.8343 \times 10^{-3}$ mN/m.

The flooding method of the millimeter-scale zirconium gel particle combination flooding system is provided in the example, which is as follows: vacuumizing the artificial core (with the length of 8.3 cm, diameter of 2.5 cm and pore volume of 11.35 mL) with a permeability of 16.98 μm², and saturating brine water in the core, sequentially saturating oil in the core, and water flooding until the effluent water cut up to 98% at 75° C.; then conducting flooding using the combination flooding system according to the following three plugs: prepositive pretreatment plug, main plug and postpositive protective plug. The specific combination flooding steps using the millimeter-scale zirconium gel particles are as follows:

(1) Prepositive pretreatment plug: the prepositive pretreatment plug is aqueous solution of the above polyether nonionic surfactant. The weight percentage of the polyether nonionic surfactant in the aqueous solution is 0.4%. The injection volume of the prepositive pretreatment plug is 1.0% of the core pore volume.

(2) Main plug: the main plug is the combination flooding system comprising: millimeter-scale zirconium gel particles (with the particle diameter of 3.3 mm), of which the weight percentage is 0.16%; and surfactant, of which the weight percentage is 0.4%. The injection volume of the main plug is 30% of the core pore volume;

(3) Postpositive protective plug: the postpositive protective plug is aqueous solution of millimeter-scale zirconium gel particles (with the particle diameter of 3.3 mm). The weight percentage of zirconium gel particles in the aqueous solution is 0.16%. The injection volume of the postpositive protective plug is 1.0% of the core pore volume.

Figure 3:
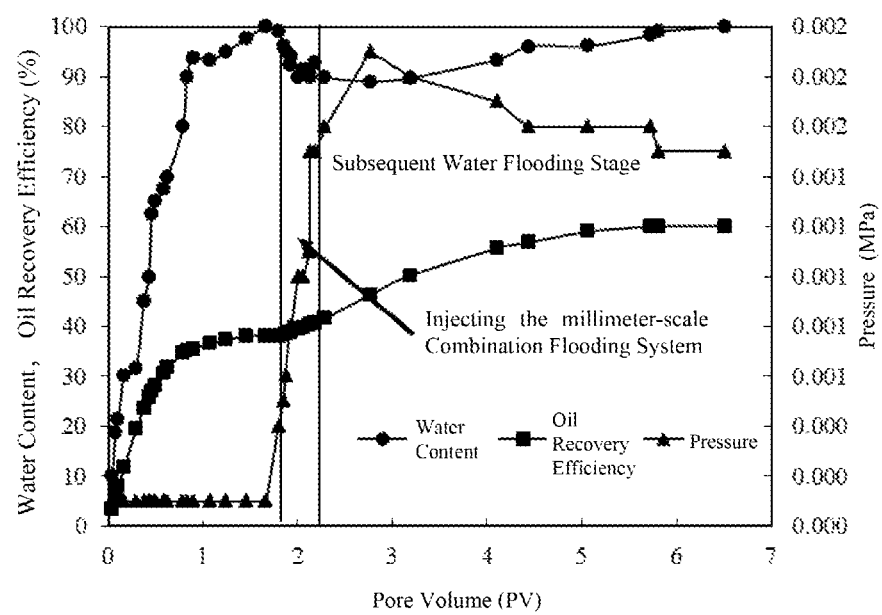
FIG. 3 shows the oil recovery curve of millimeter-scale zirconium gel particle combination flooding system.

After finishing the above three steps, aging for 5 days under 75° C., conducting waterflooding again till the watercut reaches 98%. From FIG. 3 showing the oil recovery curve, it can be seen that after injecting the millimeter-scale zirconium gel particle combination flooding system, the pressure is increased significantly in the subsequent water flooding stage and remains high after injection of water of 3 times of pore volume. Finally, the oil recovery increases significantly by 22.01%.

The invention claimed is:

1. A flooding method, comprising the following steps:
    a) injecting a prepositive pretreatment plug into stratum, the injection volume of which ranges from 0.1% to 1.0% of the formation porous volume; the prepositive pretreatment plug is an aqueous solution of a polyether nonionic surfactant, the weight percentage of the polyether nonionic surfactant in the aqueous solution ranges from 0.1% to 0.4%;
    b) injecting a main plug into stratum, the injection volume of which ranges from 30% to 50% of the formation porous volume;
    wherein the said main plug is a zirconium gel particle combination flooding system;
    wherein the zirconium gel particle combination flooding system comprises: multi-scale zirconium gel particles, polyether nonionic surfactant and water; wherein the weight percentage of multi-scale zirconium gel particles in the combination flooding system ranges from 0.16% to 0.24%; the weight percentage of polyether nonionic surfactant in the combination flooding system ranges from 0.1% to 0.4%; and the remainder is water;
    c) injecting a postpositive protective plug into stratum, the injection volume of which ranges from 0.1% to 1.0% of the formation porous volume; the postpositive protective plug is an aqueous solution of nano-scale, micron-scale or millimeter-scale zirconium gel particles, the weight percentage of zirconium gel particles in the aqueous solution ranges from 0.16% to 0.24%;
    d) shutting in the well for five to ten days; and
    e) starting up the well to reproduce,
    wherein a formula of polyether nonionic surfactant is as follows:

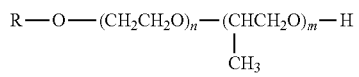
in the formula, R represents $C_8$-$C_{13}$ alky; n represents the total number of ethoxy groups, n=2-4; m represents the total number of propoxy groups, m=1, 2; wherein n and m are integers.
\* \* \* \* \*